2,955,057
CONDENSATION PRODUCTS OF FORMALDEHYDE WITH LEVULINIC HYDANTOIN

Domenick D. Gagliardi, East Greenwich, and William J. Jutras, Jr., Peace Dale, R.I., assignors to Argus Chemical Corporation, Brooklyn, N.Y.

No Drawing. Filed May 27, 1957, Ser. No. 661,577

13 Claims. (Cl. 117—139.4)

This invention relates to mono- and di- methylol compounds of the hydantoin derived from levulinic acid and resins made by curing such derivatives.

The hydantoin derived from levulinic acid and having the following structure

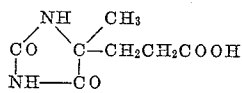

is described in the literature. See H. R. Henze and R. J. Speer, J.A.C.S., 64, 522 (1942), and U.S. Patent 2,658,912.

In the following, the hydantoin derived from levulinic acid will be called "levulinic hydantoin" or LH, for short.

Hydantoin formaldehyde resins are described in the literature as for instance in U.S. 2,155,863 and U.S. 2,532,278. However, these patents concern only hydantoins substituted in 5-position by two alkyl or similar groups. Monomethylol-dimethyl-hydantoin is on the market, particularly as an odorless formaldehyde donor. Dimethyl-hydantoin formaldehyde resins are recommended as binders, adhesives, and for coating purposes.

The essential difference between the known products and the products of our invention is that, in our case, one of the substituents in the 5-position of our starting material contains a carboxyl group, which obviously increases the water solubility of the formaldehyde condensation product, particularly interesting for solubilization of copolymers with urea, melamine, etc. It also changes the performance of such formaldehyde condensation products as will be shown in the following.

It is an object of this invention to provide a process for the preparation of formaldehyde condensation products with LH and to show certain applications for a resin made by curing such condensation products.

It is a further object of this invention to provide a process of making ethers of such methylol compounds.

A further object is to provide a process of making copolymers of LH formaldehyde condensation products and urea- or melamine-formaldehyde resins.

Other objects of the invention will appear hereinafter.

It is known, for instance, that urea and melamine-formaldehyde resins are being widely used in the textile industry as finishing agents for making fabrics crease-resistant. However, these finishes show a serious drawback. When cloth finished with such resins is laundered and bleached, chlorine is retained in the cloth owing to a gradual replacement by chlorine of the hydrogen atoms which are linked to the N-atoms of such resins. This causes a substantial loss of tensile strength of the cloth in each washing and bleaching and leads to complete destruction of the fiber after a few cleanings.

In order to overcome this drawback, resins are now being made from the condensation products of cyclic ureas, such as ethylene urea, and formaldehyde. In the case of the dimethylol ethylene urea, there is no free H atom linked to nitrogen left. These resins achieve crease-resistance without chlorine retention and are, therefore, taking a constantly increasing share of the market, compared to the corresponding products made from urea or melamine, although they are much more expensive.

Hydantoins also represent cyclic compounds in which only one H atom is linked to each nitrogen. When these hydrogens are replaced by the $CH_2OH$ groups, the same effect should be obtained as described above for the ethylene urea formaldehyde resins. But, while these resins show crease-proofing of textiles, they retain Cl no less than ordinary urea-formaldehyde resins.

The reason for this may be that the hydantoin ring opens much more easily than the ring in cyclic ureas. The ring opening causes formation of another free H atom linked to nitrogen, and, consequently, chlorine retention.

In the methylol derivatives made from LH of this invention, the presence of the free COOH group probably exerts a buffering effect, and no opening of the hydantoin ring occurs in alkaline medium, as in laundering. Such resins show no chlorine retention.

Moreover, the presence of the carboxyl group in the LH-formaldehyde condensation products gives us the possibility of forming salts which were found to have valuable properties. The sodium salt is useful as a soil conditioner, the copper salt has fungicidal properties. The cobalt, iron, and manganese salts are useful as plant nutrients; others, like the aluminum salt, serve as adhesives and binders.

A further group of compounds which are of technical importance are the ethers of the methylol compounds that lend themselves to textile application if the alcohol forming the ether is of low molecular weight. Ethers with higher alcohols are of interest for coating purposes.

The copolymers of LH methylol compounds and urea-and-melamine-formaldehyde are anionic resins useful in imparting an anti-static effect to textiles and for increasing the wet strength of paper.

The invention will now be more fully described in the following examples, but it should be understood that these are given by way of illustration and not of limitation and that many changes in the details can be made without departing from the spirit of the invention.

All parts are by weight, except where otherwise stated.

EXAMPLE 1

*Preparation of monomethylol levulinic hydantoin*

46.5 parts of LH (¼ mol) were dissolved in 186.0 parts of water by heating to 50° C. The resulting clear yellow solution was cooled to 25° C. 34.0 parts of barium hydroxide crystals $(Ba(OH)_2 \cdot 8H_2O)$ were dissolved in the solution giving a pH of 7.15. The addition of 21.0 parts of 37% aqueous formaldehyde (slight excess over ¼ mol) decreased the pH of the solution to 6.00. The pH was adjusted to 8.50 by adding 5.5 parts of barium hydroxide crystals. After stirring at 25° C. for one hour, 100.0 parts of 12% sulfuric acid were added to precipitate the alkaline catalyst. The resulting precipitate was allowed to settle for twenty-four hours before filtering. To complete the precipitation of barium sulfate, 10.0 parts of ⅔ Normal sulfuric acid were added to the filtrate. After aging for twenty-four hours at room temperature, the second precipitate was removed by filtering. The clear yellow filtrate containing the monomethylol levulinic hydantoin was concentrated by allowing the water to evaporate for five days at room temperature. The final product, monomethylol levulinic hydantoin, was a viscous, yellow, water-soluble syrup.

EXAMPLE 2

*Preparation of dimethylol levulinic hydantoin*

A twenty percent solution of LH was prepared by dissolving 5.58 parts (0.03 mol) in 22.3 parts of water by heating to 50° C. The pH of this solution was 2.25. The pH of the solution was adjusted to 10.50 by adding 11.95 parts of 20% sodium hydroxide solution. On adding 6.0 parts of 37% aqueous (0.075 mol) formaldehyde, the pH rose to 11.25. The pH was adjusted to 10.50 by adding 3.14 parts of 10% hydrochloric acid solution. The alkaline formaldehyde solution was then heated to 50° C. and held at that temperature for one hour. After cooling to room temperature, the free formaldehyde content was found to be 0.96%. Consequently, seventy-nine percent of the available formaldehyde had reacted to yield a condensation product with the ratio of 1.9 mol formaldehyde to 1.0 mol LH. 27.45 parts of the reaction product were taken and adjusted to pH 5 by adding 2.85 parts of 20% hydrochloric acid, so that the resulting liquid represented a 14% solution of the dimethylol levulinic hydantoin.

EXAMPLE 3

392 parts LH, 12 parts p-toluenesulfonic acid and 1 liter methanol were refluxed for 9 hours. In the reflux condenser was placed a ceramic thimble containing dryerite, so that the condensing liquid was freed from water formed in the esterification. Subsequently, the reaction product was stirred with 20 parts charcoal, filtered, the filtrate stirred with 6.5 grams BaCO3 and filtered and finally concentrated to a total volume of 500 cc. This residue was allowed to stand in the icebox for one day. 320 grams crystals of the methyl ester (76%) M.P. 68–71° C. were so obtained.

*Preparation of the dimethoxymethylether of the methyl ester of levulinic hydantoin*

80.0 parts methyl ester of LH, 54.6 parts methyl formcel (55% CH2O), 2.0 parts dibasic sodium phosphate (Na2HPO4.7H2O), 0.2 part 20% sodium hydroxide and 72.0 parts of methanol were stirred together at 25° C. for fifteen minutes obtaining a colorless solution, pH 3.38. The pH was adjusted to 8.20 by the addition of 1.2 parts of 20% sodium hydroxide. The solution was refluxed for two hours. The pH of the reaction product was then adjusted to 5.00 by adding 2.56 parts of 20% phosphoric acid. A flocculant precipitate developed on the addition of phosphoric acid. The acid methanol solution was refluxed for one hour, cooled, and neutralized to pH 7.0 with 1.10 parts 20% sodium hydroxide. The reaction product had a ratio of 1.9 moles of formaldehyde: 1.0 mole of methyl ester of LH. The clear methanol solution contained approximately 55% of the monomeric dimethoxymethyl derivative of methyl ester of LH.

EXAMPLE 4

*Preparation of polymerized methoxymethylethers of levulinic hydantoin*

55.8 parts LH, 40.9 parts methyl formcel (a methanol solution containing 55% CH2O) and 14.4 parts of methanol were mixed together forming a thick, yellowish slurry. This slurry was diluted with 19.2 parts of methanol and the mixture was heated to reflux obtaining a yellow-brown solution—pH 3. After refluxing for two hours, the reaction solution was cooled to room temperature. Determination of free formaldehyde by the sodium sulfite method indicated that 48% of the available formaldehyde had reacted giving a product with the ratio: 1.2 mol formaldehyde:1.0 mol LH. The final reaction product represented a polymerized methoxymethyl derivative of levulinic hydantoin of 55% concentration in methanol formaldehyde solution.

EXAMPLE 5

*Preparation of a highly condensed levulinic hydantoin formaldehyde resin*

55.8 parts LH, 60.8 parts 37% uninhibited aqueous formaldehyde, 1.5 parts dibasic sodium phosphate (Na2HPO4.7H2O)

and 32.0 parts of water were stirred together to form a pale yellow slurry. The mixture was refluxed for one half hour and the pH was found to be 2.65. The resulting solution was cooled to room temperature. Determination of free formaldehyde indicated that 50% of the available formaldehyde had reacted to form a condensation product containing 1.1 moles formaldehyde:1.0 mol LH.

EXAMPLE 6

*Preparation of a polymethylene levulinic hydantoin resin*

55.8 parts of LH, 36.4 parts 37% formaldehyde, 1.5 parts dibasic sodium phosphate (Na2HPO4.7H2O), 20.8 parts water, and 0.5 part 20% sodium hydroxide were mixed together and heated to 70° C. The pH of the resulting clear yellow solution was 1.20. The addition of 3.0 parts of 20% sodium hydroxide raised the pH to 2.90. The solution was then heated for two hours at 70° C., and thereafter cooled to room temperature; the pH was 2.80. The pH of the solution was adjusted to 3.00 by adding 1.0 part of 20% sodium hydroxide and the solution was heated for two more hours at 70° C. The reaction product was then concentrated by heating from 25° C. to 90° C. at 100 mm. pressure. The resulting product was a viscous tacky resin which was water-soluble and could not be cured to an insoluble state even after prolonged heating at elevated temperatures.

EXAMPLE 7

*Preparation of an anionic urea-LH formaldehyde resin*

30.0 parts urea (½ mol) were mixed with 114.0 parts aqueous 37% formaldehyde 1.4 mol solution to which 0.15 part sodium bicarbonate (NaHCO3) were added. This mixture was heated to 90° C. with stirring for 1 hour, whereby it became cloudy; the pH was 7.0. 46.5 parts (¼ mol) LH and 4.0 parts 20% sodium hydroxide were added, and the solution held at 70° C. for one hour. A clear yellow-brown solution resulted, which was cooled to room temperature. The so-obtained resin was clear and did not dissolve in water in low concentrations, but dissolved in the presence of amines or alkali, indicating its anionic nature.

A similar resin is obtained by substituting 40.0 parts melamine for 30.0 parts urea.

EXAMPLE 8

A very hard resin was obtained when the product made in accordance with Example 7 was cured at 160° C. for 10 min. The resulting resin is completely water-insoluble, but is clearly soluble when the pH of the water is brought up to 8–9 by addition of alkali.

EXAMPLE 9

10.0 parts of the product of Example 2 were placed in a Petri dish, mixed with 2 drops of 20% phosphoric acid and cured at 320° F. for 10 minutes. A soft film was obtained, which was water soluble. A clear aqueous solution was obtained with a neutral pH. Of the solution, portions were taken and placed in several containers. The solution in each container was used for the preparation of a different salt, by adding aqueous solutions of sodiumhydroxide, aluminum sulfate, zinc fluoborate, magnesium fluoride, calcium chloride, manganesesulfate, cobalt chloride, or cupric chloride, respectively. All the mixtures remained clear. The mixture with CuCl2 has fungicidal properties; the mixture with Al2(SO4)3 has adhesive properties.

EXAMPLE 10

The reaction product of Example 2 was applied to cotton sheeting, using 2% zinc nitrate [Zn(NO$_3$)$_2$.6H$_2$O] as catalyst. The cloth samples were cured at 160° C. for 5 minutes. Crease-resistance and standard AATCC chlorination and scorching tests were made, also comparison tests with Rhonite R-1 (dimethylol ethylene urea 50% active). The Rhonite R-1 was applied in 10% aqueous solution.

|  | Crease Recovery Angle | Original Tensile Strength | AATCC Chlorine Test After Test |
|---|---|---|---|
| Product from Example 2 | 135 | 34 | 34 |
| Rhonite R-1 | 135 | 37 | 37 |
| Untreated cloth | 80 | 55 | 53 |

The same cloth was treated with a 15% solution of a formaldehyde-dimethyl hydantoin condensation product. The Crease Recovery Angle was 125, but the sample showed no chlorine resistance at all.

What we claim is:

1. A process of preparing methylol derivatives of levulinic hydantoin of the formula

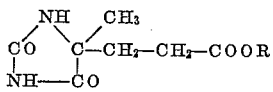

in which R stands for the group consisting of H and methyl, which comprises reacting said hydantoin with formaldehyde at a molar ratio of about 1-3 mols of formaldehyde for 1 mol of hydantoin, while maintaining the pH between 7 and 10 by addition of a compound selected from the group consisting of alkali metal hydroxides and alkaline earth hydroxides and keeping the mixture for one half hour to four hours at a temperature between 25° C. and 100° C.

2. As novel products, the methylol derivatives of levulinic hydantoin as prepared according to claim 1.

3. The process of preparing monomeric methyl ethers of methylol hydantoins as prepared according to claim 1, which comprises reacting levulinic hydantoin with formaldehyde at the molar ratio of about 1-3 mols formaldehyde for 1 mol hydantoin in excess methyl alcohol first for one-half to four hours at temperatures between 25 and 100° C. at a pH between 7 and 10, and subsequently adjusting the pH to 3-5 and heating at reflux temperature for at least one hour.

4. The process of preparing polymeric methylethers of methylol hydantoins which comprises reacting levulinic hydantoin of the formula

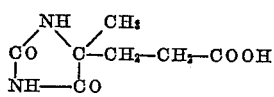

with formaldehyde at the molar ratio of about 1-3 mols formaldehyde for 1 mol hydantoin in excess methyl alcohol for about 2 hours while refluxing the same, the pH of the solution being from 3-5.

5. As novel products, the ethers of methylol hydantoins as prepared according to claim 3.

6. As novel products, the ethers of methylol hydantoins as prepared according to claim 4.

7. A process of preparing a water-soluble resin, which comprises reacting levulinic hydantoin with formaldehyde as described in claim 1 and acidifying the reaction product to a pH of 2.5-5 while refluxing for at least one-half hour, and thereafter evaporating the water.

8. A water-soluble resin made from levulinic hydantoin and formaldehyde as described in claim 7.

9. A process for preparing an anionic urea-levulinic hydantoin resin which comprises reacting about 3 mols of formaldehyde with 1 mol urea by heating one hour at 90° C. in the presence of alkali bicarbonate as a catalyst, followed by the addition of 0.5 mol of levulinic hydantoin of the formula

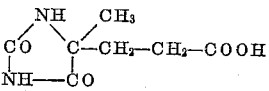

and subsequently reacting for one hour at about 70° C. to produce a clear solution of an anionic resin.

10. As a new composition, the resin obtained by the process of claim 9.

11. A process for preparing an anionic melamine-levulinic hydantoin resin which comprises reacting about 3 mols of formaldehyde with 1 mol melamine by heating one hour at 90° C. in the presence of alkali bicarbonate as a catalyst, followed by the addition of 0.5 mol of levulinic hydantoin of the formula

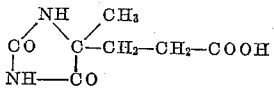

and subsequently reacting for one hour at about 70° C. to produce a clear solution of an anionic resin.

12. As a new composition, the resin obtained by the process of claim 11.

13. A process for crease-proofing textiles by padding the fabric in a 10-20% aqueous solution of the dimethylol derivative of the levulinic hydantoin of the formula

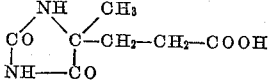

containing 2% zinc nitrate and subsequently drying and curing the fabric at 149° to 177° C. for 2-5 minutes.

References Cited in the file of this patent

UNITED STATES PATENTS

| 2,155,863 | Jacobson | Apr. 25, 1939 |
| 2,389,416 | D'Alelio | Nov. 20, 1945 |
| 2,658,912 | Pfister et al. | Nov. 10, 1953 |